No. 745,273. PATENTED NOV. 24, 1903.
T. BRANTLEY.
BRUSH FOR COTTON GINS.
APPLICATION FILED SEPT. 21, 1903.
NO MODEL.

WITNESSES:
Ernest Pulsford.
INVENTOR:
Thomas Brantley.
BY HIS ATTORNEYS

No. 745,273.

Patented November 24, 1903.

UNITED STATES PATENT OFFICE.

THOMAS BRANTLEY, OF ALBANY, GEORGIA, ASSIGNOR OF ONE-HALF TO AUGUSTUS J. SMITH AND JAMES H. ALLEN, OF ALBANY, GEORGIA.

BRUSH FOR COTTON-GINS.

SPECIFICATION forming part of Letters Patent No. 745,273, dated November 24, 1903.

Application filed September 21, 1903. Serial No. 174,004. (No model.)

*To all whom it may concern:*

Be it known that I, THOMAS BRANTLEY, a citizen of the United States, residing at Albany, in the county of Dougherty and State of Georgia, have invented certain new and useful Improvements in Brushes for Cotton-Gins, of which the following is a specification.

My present invention relates to that class of cotton-gin brushes in which disks mounted on a shaft support brush-bars to which tufts or bristles are attached.

In my United States Patent No. 732,999, of July 7, 1903, I have illustrated a brush in which five disks are secured to the shaft and are spaced equal distances apart, with sheet-metal shields arranged between them and inclosing the shaft. The brush-bars consist of separate pieces of metal separately attached to the disks, and the tufts or bristles are separately attached to the bars by compressing the ferrules of the tufts into dovetailed or undercut notches in the bars.

According to my present invention I employ disks and shields, as before; but instead of using separate brush-bars I form the bars by suitably bending the sheet-metal shields in such manner as to form a series of radial flanges on the periphery of the shields, which are notched to receive the tufts.

Figure 1:
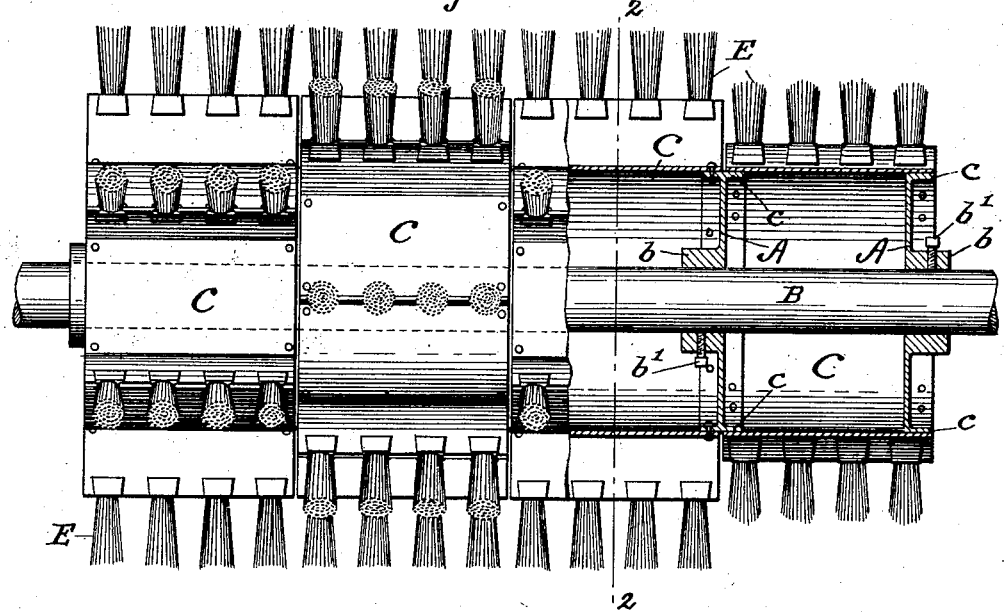
Figure 2:
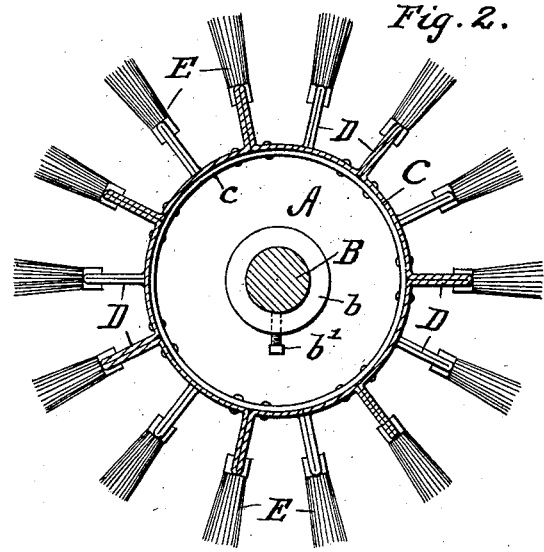
Figure 3:
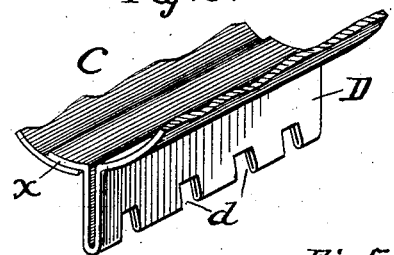
Figure 4:
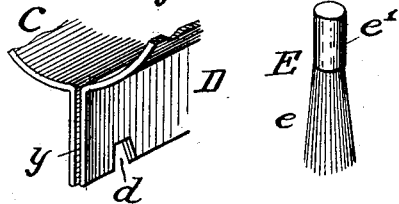
Figure 5:
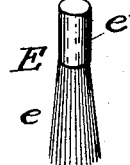
Figures 6, 7:
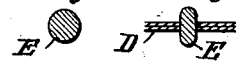
Figure 8:
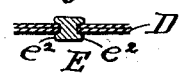
Figure 9:
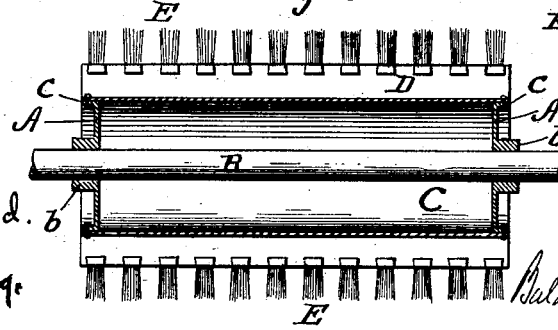

In the accompanying drawings, illustrating my invention, Figure 1 is a plan view, partly broken away, of a rotary gin-brush embodying my improvements. Fig. 2 shows a transverse section on the line 2 2 of Fig. 1. Fig. 3 is a detail view in perspective on an enlarged scale, illustrating the manner of forming the flanges and of securing the ends of the cylindrical shield. Fig. 4 shows a modified way of forming one of the flanges and of attaching the ends of the shield. Fig. 5 is a perspective view of one of the tufts. Fig. 6 shows a cross-section of one of the tufts. Figs. 7 and 8 illustrate the manner of securing the tufts to the flanges. Fig. 9 shows a vertical central section through a modified form of rotary brush.

The disks A (shown in Fig. 1) are arranged equal distances apart on a central shaft B. Each disk is formed with a hub $b$, carrying a set-screw $b'$, which engages the shaft B, and between each pair of disks is arranged a cylindrical sheet-metal casing or shield C, the edges of which rest on flanges $c$ on the disks, as indicated in Fig. 1. I have shown in Fig. 1 five disks. The two outer disks are provided with a flange $c$ on one side only, while the three inner disks are provided with flanges $c$ on each side. Each shield C is formed with a series of radial flanges D, provided with a series of dovetailed or undercut notches $d$ to receive the inner ends of the tufts E. These flanges D are made by crimping or doubling the metal upon itself at regular distances apart. The sheet metal employed for making the shields is preferably galvanized iron of, say, 20 gage, so that the flanges are stout and strong, being preferably made from three thirty-seconds to one-eighth of an inch thick, and the flanges are preferably arranged about one and three-quarters of an inch apart.

One piece of sheet metal is employed to form each shield and all the ribs, flanges, or brush-bars D, and the ends of the metal may be secured together either by soldering, brazing, riveting, or in other suitable ways. Preferably the ends of the shield are brought together, as indicated at $x$ in Fig. 3, and soldered; but the ends of the metals may be brought together, as indicated at $y$ in Fig. 4, and soldered, brazed, riveted, or otherwise secured. The tufts E are of the form shown in my patent of July 7, 1903, above mentioned, and also in my Patent No. 723,579, of March 24, 1903—that is to say, each tuft consists of bristles $e$, secured within a ferrule $e'$ by means of elastic or compressible cement. Each tuft is secured in one of the notches $d$ in the manner illustrated in Figs. 6, 7, and 8. At first the ferrule is cylindrical, as indicated in Fig. 6. It is flattened and made to enter a notch $d$ in the manner indicated in Fig. 7. Then it is further compressed until flanges $e^2$ are formed in the ferrule on opposite sides of the rib or flange D. The compression is such as to cause the ferrules to completely fill the notches as well as to provide the flanges $e^2$. This form of connection has been found to be most secure and to withstand all strains.

Ordinarily in this class of brushes the brush-bars or brush-sticks are from three-quarters of an inch to one inch thick. By employing sheet-metal ribs or brush-bars three thirty-seconds of an inch thick or less more space may be provided between the brush-bars, and thus the brush will act more powerfully as a fan to create a blast that will drive the cotton through the flue to the condenser. In the construction shown there is no possibility of the brush-bars working loose, as they are formed integrally with the shields, which are in turn securely riveted to the disks. The construction is lighter than those heretofore employed and is less expensive than the form of brush shown in my patent of July 7, 1903, before mentioned.

In Fig. 1 I have shown the brush-bars made in sections out of line with each other; but my improvements may be embodied in a brush in which only two disks or heads A are employed, as in Fig. 9.

While my improvements are especially designed for use in rotary brushes for cotton-gins, they may also be embodied in other kinds of brushes.

I claim as my invention—

1. A rotary brush comprising a shaft, disks secured thereto, a sheet-metal shield or casing attached to the disks and having a series of radial flanges forming brush-bars; and tufts or bristles attached to said flanges.

2. A rotary brush comprising disks, a sheet-metal shield or casing attached to the disks and formed integrally with a series of radial flanges made by doubling the metal at regular distances apart around the periphery of the shield, and tufts or bristles attached to the flanges.

3. A brush consisting of a piece of sheet metal crimped or doubled upon itself to form a series of flanges constituting brush-bars and having notches at their edges and tufts or bristles having their ferrules compressed in the notches and flanged on opposite sides thereof.

4. A rotary brush comprising a shaft, disks attached thereto, a sheet-metal casing or shield attached to the disks and having a series of radial flanges on its periphery formed by crimping or doubling the metal of the shield, and tufts or bristles attached to the flanges.

In testimony whereof I have hereunto subscribed my name.

THOMAS BRANTLEY.

Witnesses:
J. G. BARRON,
SAML. W. SMITH.